(12) United States Patent
Matrascia et al.

(10) Patent No.: US 9,919,566 B2
(45) Date of Patent: Mar. 20, 2018

(54) WINTER TYRE

(75) Inventors: Giuseppe Matrascia, Milan (IT); Vito Bello, Milan (IT); Maurizio Boiocchi, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 1257 days.

(21) Appl. No.: 13/266,847

(22) PCT Filed: May 27, 2010

(86) PCT No.: PCT/IB2010/052358
§ 371 (c)(1),
(2), (4) Date: Jan. 17, 2012

(87) PCT Pub. No.: WO2010/136989
PCT Pub. Date: Dec. 2, 2010

(65) Prior Publication Data
US 2012/0118457 A1    May 17, 2012

(30) Foreign Application Priority Data
May 29, 2009    (IT) .............................. PD2009A0158

(51) Int. Cl.
*B60C 11/12* (2006.01)
*B60C 11/03* (2006.01)

(52) U.S. Cl.
CPC .......... *B60C 11/12* (2013.01); *B60C 11/0304* (2013.01); *B60C 2011/1213* (2013.01); *B60C 2011/1227* (2013.01)

(58) Field of Classification Search
CPC ............. B60C 11/12; B60C 2011/1213; B60C 11/0304; B60C 2011/1227
See application file for complete search history.

(56) References Cited

U.S. PATENT DOCUMENTS 2,808,867 A    10/1957    Buddenhagen et al.
6,003,575 A    12/1999    Koyama et al.
(Continued)

FOREIGN PATENT DOCUMENTS

DE    19543940 A1 *    5/1997
EP    0 823 340 A1    2/1998
(Continued)

OTHER PUBLICATIONS

Machine translation for German 19543940 (no date).*
(Continued)

*Primary Examiner* — Steven D Maki
(74) *Attorney, Agent, or Firm* — Finnegan, Henderson, Farabow, Garrett & Dunner, L.L.P.

(57) ABSTRACT

A tire includes: a tread band on which is defined a radially outer tread surface, a first plurality of blocks provided on the tread band, and at least a first sipe of the restrained type extending on at least one block of the first plurality in a substantially axial direction defined on the tread band. The first sipe is configured so as to define, between a first and a second block portion divided by the first sipe, at least two separate and distinct couplings of the male/female type, such as to prevent the mutual displacement of the block portions in any direction which, at the block, is substantially tangential to the tread surface, and such as to permit mutual displacement of the block portions in a direction incident to the tread surface. In addition, the first sipe does not intersect any other sipe of the restrained type within the block.

17 Claims, 2 Drawing Sheets

(56) References Cited

U.S. PATENT DOCUMENTS

| | | | | |
|---|---|---|---|---|
| 2002/0139469 | A1* | 10/2002 | Shiraishi | B60C 11/00 |
| | | | | 156/128.6 |
| 2005/0173035 | A1* | 8/2005 | Heinen | 152/209.9 |
| 2006/0151078 | A1 | 7/2006 | Colombo et al. | |
| 2007/0089821 | A1* | 4/2007 | Kishizoe | B29D 30/0606 |
| | | | | 152/209.2 |
| 2008/0156405 | A1* | 7/2008 | Tanabe | B60C 11/11 |
| | | | | 152/209.18 |

FOREIGN PATENT DOCUMENTS

| | | | |
|---|---|---|---|
| EP | 1 195 271 | A2 | 4/2002 |
| EP | 1 312 490 | A1 | 5/2003 |
| EP | 1923234 | A1 * | 5/2008 |
| GB | 742821 | | 1/1956 |
| JP | 62-241710 | A * | 10/1987 |
| JP | 02-182503 | A * | 7/1990 |
| JP | 07-205617 | A * | 8/1995 |
| JP | 10-035226 | | 2/1998 |
| JP | 2000-006620 | A * | 1/2000 |
| JP | 2000-25419 | | 1/2000 |
| JP | 2005-162197 | A * | 6/2005 |
| JP | 2005-297758 | | 10/2005 |
| JP | 2006-168498 | A * | 6/2006 |
| RU | 2022805 | C1 * | 11/1994 |
| WO | WO 2004/056588 | A1 | 7/2004 |
| WO | WO 2009/077808 | A1 | 6/2009 |

OTHER PUBLICATIONS

Machine translation for Russia 2,022,805 (no date).*
Machine translation for Japan 2000-006620 (no date).*
Machine translation for Japan 2005-162197 (no date).*
Machine translation for Japan 2006-168498 (no date).*
Machine translation for Japan 07-205617 (no date).*
Notice of Reasons for Rejection with English language translation mailed by Japanese Patent Office dated Jan. 28, 2014 in corresponding Japanese Application No. 2012-512515.
Official Action with English language translation issued by Russian Patent Office dated Feb. 27, 2014 in corresponding Russian Application No. 2011152201.

* cited by examiner

WINTER TYRE

CROSS REFERENCE TO RELATED APPLICATIONS

This application is a national phase application based on PCT/IB2010/052358, filed May 27, 2010, and claims the priority of Italian Application No. PD2009A000158, filed May 29, 2009, the content of both of which is incorporated herein by reference.

BACKGROUND OF THE INVENTION

Field of the Invention

The present invention relates to a winter tyre equipped with a tread band in which the sipes are configured particularly in order to improve the grip of the tyre on a dry roadbed without adversely affecting the grip characteristics on a wet, or snow-covered or icy roadbed.

Description of the Related Art

It is known that, in dry road conditions, a tyre having a tread band with a smooth surface (slick tyre) provides road-holding performances superior to a similar tyre which, with other features being the same, has a tread band on which the surface is equipped with grooves, defining a plurality of blocks which are themselves involved by sipes. This is due fundamentally to the fact that a tread band with a smooth surface offers a greater contact surface with the ground and has a greater rigidity when subjected to tangential (or "shear") stresses.

On the other hand, on a wet or snow-covered roadbed, a tyre with a tread band having a smooth surface provides performances which are drastically below that of a similar tyre in which the tread band has a surface equipped with sipes and grooves. Indeed, the provision of these latter is fundamental for permitting the outflow of water which may be present on the roadbed and for avoiding the occurrence of lifting of the tyre (aquaplaning), while the sipes provided on the blocks of the tread band make it possible to improve the road-holding of the tyre on a snow-covered roadbed, owing to their ability to retain within them portions of snow which, as is known, are capable of providing greater friction with the snow present on the roadbed than that provided by the tread band itself.

A tyre suitable for travelling in all the road conditions mentioned above is therefore required to balance the opposed configuration requirements so that the provision on the tread band of grooves and, on the blocks defined by the latter, of sipes, is optimised according to the desired requirements in use.

One of the causes of the lack of road-holding of tyres with a grooved tread band is attributable to the low resistance of the blocks to shear stresses, which leads to their excessive deformation. This lack is more particularly marked when the blocks are provided with sipes.

It is pointed out that, in the present context, the term "sipe" is intended to mean a small groove provided in a block and having a thickness of between 0.1 and 1.5 millimeters and a depth of between 1 and 15 millimeters.

Moreover, the term "tangentially constrained male/female-type coupling", referred in this context to two portions of a block, is intended to mean a coupling between the two portions which is configured in such a way as to prevent the mutual displacement of those portions in any direction which, at the block, is substantially tangential to a radially outer surface of the block which forms part of the tread surface of the tyre.

The term "sipe of the restrained type" is intended to mean a sipe configured in such a manner that the block portions delimited thereby have at least one tangentially constrained male/female-type coupling.

On the other hand, the term "sipe of the non-restrained type" is intended to mean a sipe configured in such a way that the block portions delimited thereby have no tangentially constrained male/female-type coupling.

Moreover, the term "tangential direction" with respect to the tread surface at a point thereof is intended to mean any direction belonging to the plane tangential to the tread surface at that point. When referring to blocks of the tread band, the tangential plane may, as a first approximation, be identified with the plane on which the tyre rolls when the blocks are in contact with the roadbed.

EP 1195271 shows a tyre in which the tread band is equipped with a plurality of blocks extending in succession along the circumferential development of the tread band, there being provided on each block a first plurality of sipes of the restrained type extending in an axial direction and intersecting a second plurality of sipes of the restrained type extending in a circumferential direction, in such a manner as to sub-divide each block into a kind of jigsaw puzzle.

JP 2000-25419 shows a tyre in which the tread band is equipped with a plurality of blocks extending in succession along the circumferential development of the tread band, there being provided on each block a plurality of sipes of the restrained type extending in an axial direction. According to the teaching of that document, each sipe of the restrained type is configured so as to define a single coupling of the tangentially constrained male/female type between the two block portions which are separated by the sipe.

GB 742821 shows, among the different embodiments described therein, a tyre on the tread band of which are provided blocks, each of which extends along the entire circumferential development of the tread band and is involved by a single sipe, which follows the circumferential course of the block and is configured so as to define a continuous succession of couplings of the male/female type which are constrained tangentially between the two block portions separated by the sipe.

SUMMARY OF THE INVENTION

The Applicant firstly verified that the presence of sipes of the restrained type on the blocks increases their rigidity when subjected to shear stresses, improving the performance of the tyre on a dry roadbed, both during braking and during traction and also when taking bends.

The Applicant then established that the rigidity of a block increases, for a given number of sipes of the restrained type present thereon, with an increase in the number of couplings of the tangentially constrained male/female type that each sipe of the restrained type defines between the two block portions. In particular, the Applicant verified that sipes of the restrained type provided with only one tangentially constrained male/female-type coupling may not be very effective, particularly when provided on blocks having a significant surface area.

The Applicant also observed that the possibility of relative displacement in a radial direction between the block portions which are separated by a sipe imparts to the tyre an improved behaviour when in wet, or snow-covered or icy roadbed conditions.

By designing and testing blocks with different configurations of sipes of the restrained type, the Applicant established that in blocks of the type described for example in EP 1195271, a state of mutual locking of the block portions defined thereby took place which actually impeded any appreciable relative displacement of the block portions in the radial direction, consequently reducing the grip performance of the tyre on a wet, or snow-covered or icy roadbed. The blocks actually assumed a behaviour very similar to a tyre with blocks devoid of sipes.

The Applicant then perceived that in order to adapt to the aforesaid different requirements, it was necessary to optimise the configuration and the arrangement of the sipes of the restrained type on the block, so as to lock, as effectively as possible, the block portions separated by the sipes of the restrained type in relation to relative displacements in any direction tangential to the tread surface, without however impeding the possibility of relative displacement between those block portions in a direction incident to the tread surface.

The Applicant finally found that by providing one or more sipes of the restrained type extending axially within a plurality of blocks, each sipe having at least two tangentially constrained couplings of the male/female type and avoiding the sipes of the restrained type intersecting with each other within the blocks, a tyre is obtained which provides optimum grip performances both on a wet, or snow-covered or icy roadbed, and on a dry roadbed.

In particular, in a first aspect thereof, the invention relates to a tyre comprising:
  a tread band on which a radially outer tread surface is defined,
  a first plurality of blocks provided on said tread band,
  at least a first sipe of the restrained type extending on at least one block of said first plurality in a substantially axial direction defined on said tread band,
said first sipe being configured in such a manner as to define, between a first and a second block portion which are divided by said first sipe, at least two separate and distinct couplings of the male/female type such as to prevent the mutual displacement of said first and said second block portion in any direction which, at said block, is substantially tangential to said tread surface, and such as to permit mutual displacement of said first and said second block portion in a direction incident to said tread surface, said first sipe not intersecting in said block any other sipe of the restrained type.

The Applicant established that, in this way, the block portions which are separated by the sipe of the restrained type are effectively constrained to one another in such a manner as to impart optimum rigidity to the block when subjected to shear stresses, even when the block has significant length in an axial direction. At the same time, however, by avoiding intersections between sipes of the restrained type, the block portions which are separated by the sipe of the restrained type maintain sufficient capacity for relative displacement in a radial direction.

The present invention, in the aforesaid aspect, may have at least one of the preferred features indicated hereinafter.

Preferably, on said at least one block of said first plurality there is provided a second sipe of the non-restrained type configured so as to permit, between respective block portions divided by said second sipe, mutual displacement in at least one direction substantially tangential to said tread surface.

Provision is thus made that both sipes of the restrained type and sipes of the non-restrained type are provided on the same block. In this way, there may be provided on the same block all the sipes considered necessary for permitting adequate road-holding on a wet, or snow-covered or icy roadbed, without thereby being tied to the use of only sipes of the restrained type which could lead to excessively rigid coupling between the block portions, resulting in substantial blocking of the possibility of relative displacement between them.

On the contrary, the number of sipes of the restrained type and of sipes of the non-restrained type may be adequately balanced.

Preferably, on at least one block of said first plurality there are provided at least two first sipes of the restrained type, spaced apart from each other, extending in said substantially axial direction.

More preferably, between said two first sipes of the restrained type there extends at least one second sipe of the non-restrained type.

This succession at intervals, within the same block, of sipes of the restrained type and sipes of the non-restrained type, has proved to be that which is capable of providing the best balance of the above-mentioned requirements of rigidity of the block with respect to tangential stresses and at the same time of freedom of relative displacement of the block portions in the radial direction. It will be noted that, owing to this feature, there is no block portion delimited on both the opposed sides by two restrained sipes.

It is also preferred that said second sipe extends substantially parallel to said first sipes of the restrained type.

According to a preferred feature of the invention, said at least two first sipes of the restrained type are spaced from one other by a measurement of between 3 and 30 millimeters.

Preferably, for each block of said first plurality, at most three sipes of the restrained type are arranged.

In this way the situation is avoided of the sipes of the restrained type being too close together, with consequent excessive retention of the block portion interposed between them and insufficient freedom of relative displacement in the radial direction.

According to a preferred feature, the blocks of said first plurality extend predominantly in said axial direction.

According to another preferred feature, the blocks of said first plurality extend predominantly in a circumferential direction defined on said tread band.

In this way, the sipes of the restrained type extend in an axial direction both in the blocks extending predominantly axially and in the blocks extending predominantly circumferentially, so as to maintain a configuration of the sipes which favours road-holding on a wet, or snow-covered or icy roadbed in the case of tangential stresses substantially coplanar with the circumferential direction, which are typical of the situations of traction and braking with wheels parallel to the movement of the vehicle.

According to a preferred feature, on said tread band there is provided a second plurality of blocks extending predominantly in an inclined direction with respect to said axial direction and to a circumferential direction defined on said tread band, and in at least one block of said second plurality at least a first sipe of the restrained type extends substantially parallel to said inclined direction.

According to another preferred feature, on said tread band there is provided a second plurality of blocks extending predominantly in an inclined direction with respect to said axial direction and to a circumferential direction defined on said tread band, and in at least one block of said second plurality at least a first sipe of the restrained type extends substantially perpendicularly to said inclined direction.

In this way, when blocks extending in an inclined direction are also provided on the tread surface, a configuration of restrained sipes is obtained which favours road-holding on a wet, or snow-covered or icy roadbed in the case of tangential stresses transverse to the circumferential direction, which are typical of the situations of traction and braking with wheels inclined with respect to the movement of the vehicle or of the situation when taking a bend.

Preferably, for each direction substantially tangential to said tread surface there are formed, at said male/female-type coupling, at least two distinct sections of said first sipe of the restrained type, the projections of which in said direction are superposed on one another in a non-punctiform section.

In this way, the two block portions which are separated by a sipe of the restrained type are mutually constrained independently of the direction, provided that it is tangential, of a force applied even to only one of the block portions. In other words, the two block portions behave as a single body when subjected to shear stress.

Preferably, the configuration of said first sipe of the restrained type is defined by the consecutive repetition, along the length of said first sipe of the restrained type, of a basic geometric module.

In this way, when the block portions are subjected to tangential stress, a substantially homogenous behaviour thereof is obtained over their entire extent.

In a preferred form of the invention, said at least two male/female-type couplings are of the dove-tail type.

More preferably, said at least two male/female-type couplings are configured in a substantially identical manner.

This feature makes it possible to avoid, or at least limit, within the restrained sipe, zones in which the constraining action between the two block portions is appreciably different, with a consequent lack of homogeneity in the distribution of the forces.

In addition, this feature facilitates the production of the inserts necessary for obtaining the restrained sipes during the stage of moulding the tread band.

Particularly preferably, between two consecutive male/female-type couplings between said first block portion and said second block portion there is defined a male/female-type coupling between said second block portion and said first block portion having a configuration which is substantially identical to, but of opposite direction to, said two consecutive male/female-type couplings.

This feature makes it possible to obtain a coupling between the two block portions separated by the restrained sipe which is completely homogeneous along the length of the restrained sipe.

Preferably, said first sipe of the restrained type extends within said block of said first plurality in a direction substantially perpendicular to said tread surface.

In this way, in the production stage of the tyre, the step of extraction of the inserts which are necessary for obtaining the restrained sipes in the moulding stage is facilitated.

BRIEF DESCRIPTION OF THE DRAWINGS

The features and advantages of the invention will become clearer from the detailed description of a preferred exemplary embodiment thereof, illustrated by way of non-limiting example with reference to the appended drawings, in which.

DETAILED DESCRIPTION OF THE INVENTION

With reference to the appended drawings, the reference 1 indicates as a whole a tyre produced in accordance with the present invention.

Figure 1:
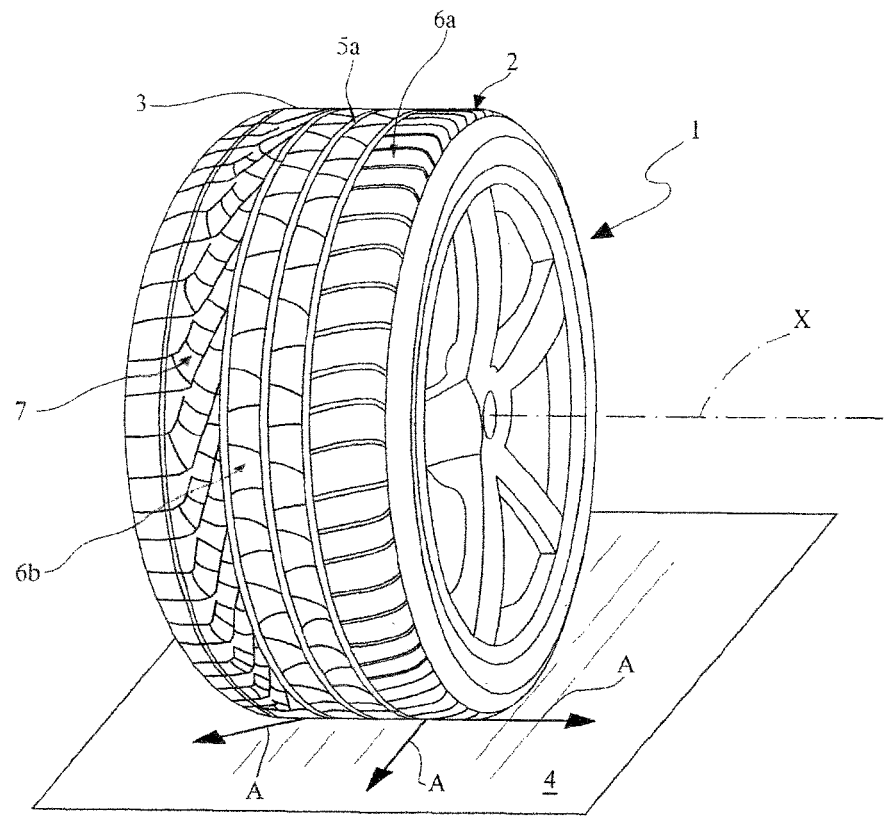
FIG. 1 is a schematic view of a tyre produced in accordance with the present invention.

The tyre 1 comprises a tyre structure, conventional per se and not shown in the appended drawings, and also a tread band 2, disposed in a radially outer position on the tyre 1 and on which is defined a tread surface 3, identified as the radially outer surface of the tread band 2, arranged to come into contact with a roadbed 4, shown schematically in FIG. 1, on which the tyre 1 is intended to roll.

On the tread band 2 there is provided a plurality of grooves which may generally have different dimensions and courses and which, in the preferred example described and illustrated herein, comprise circumferential grooves 5a, extending substantially parallel to a circumferential direction Y defined on the tread band 2, axial grooves 5b, extending substantially parallel to an axial direction X defined on the tread band 2, and inclined grooves 5c, extending so as to be inclined both with respect to the circumferential direction Y and to the axial direction X.

The grooves 5a-5c delimit and define corresponding pluralities of blocks disposed in succession along the circumferential development of the tread band 2.

Figure 2:
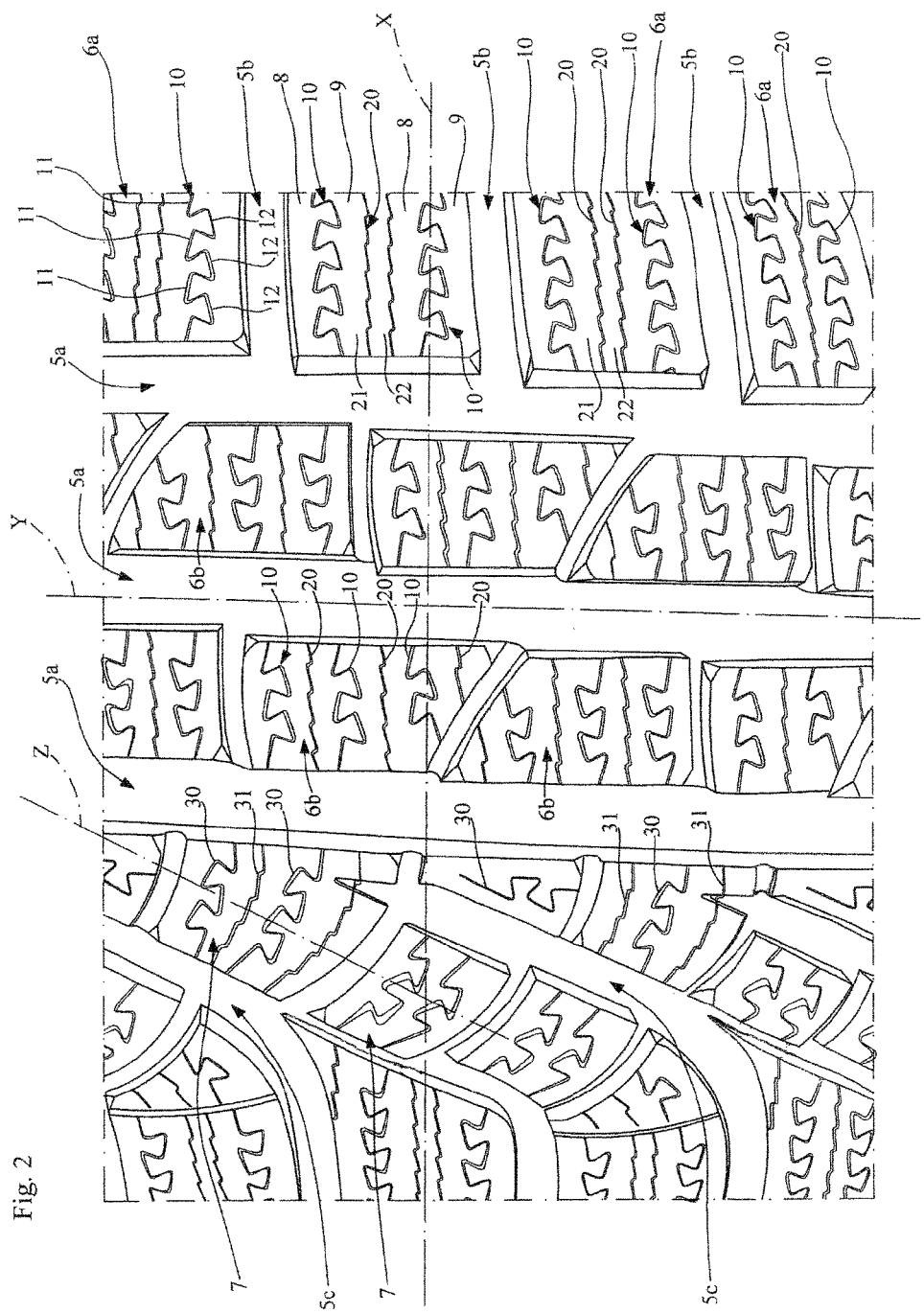
FIG. 2 is a view on an enlarged scale of a portion of tread band of the tyre in FIG. 1.

In particular, a first plurality of blocks are formed, extending predominantly axially or predominantly circumferentially, which are respectively indicated in FIG. 2 by 6a and 6b, and also a second plurality of blocks 7, extending predominantly in a direction Z, which is inclined with respect to the axial direction X and to the circumferential direction Y.

Each block 6a, 6b of the first plurality is involved by at least a first sipe 10, of the restrained type, extending substantially in the axial direction X, via the entire axial development of the block, so as to divide the block 6a, 6b into a first and a second block portion, indicated respectively by 8 and 9.

Preferably, on each block 6a, 6b there are provided two or three first sipes 10, all extending axially and spaced apart from each other by a measurement of between 3 and 30 millimeters.

Each first sipe 10 is configured so as to define, between the block portions 8 and 9, at least two couplings of the male/female type 11, which are separate and distinct, and which are constrained tangentially. In other words, the couplings 11 are such as to prevent the mutual displacement of the block portions 8, 9 in any direction A which, at said block 6a, 6b to which they belong, is substantially tangential to the tread surface 3 (exemplary directions are indicated in FIG. 1).

However, each first sipe 10 extends towards the inside of the block 6a, 6b, substantially perpendicularly to the tread surface 3, in such a manner as to permit the mutual displacement of the block portions 8, 9 in a substantially radial direction.

Moreover, on each block 6a, 6b there are provided at most three first sipes 10, and none of these intersects with another sipe of the restrained type.

In the preferred example described herein, the male/female-type couplings 11 are of the dove-tail type, although different configurations may be used provided that they are suitable for tangentially constraining the block portions 8, 9, which are separated by the first sipe 10, as defined above.

Figure 3:
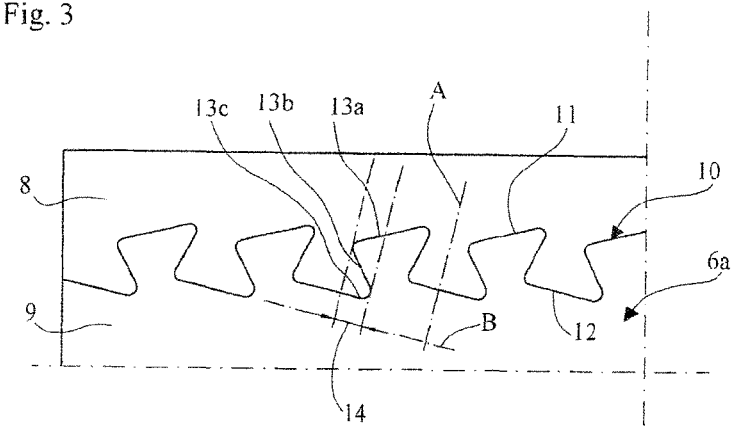
FIG. 3 is a view on a more enlarged scale of a region of the portion of tread band of FIG. 2.

In particular, first sipes are suitable which have a configuration in which, for each direction A substantially tangential to the tread surface 3 there are formed, at the male-female type coupling 11, at, least two separate sections of the first sipe 10, the projections of which in the direction A are superposed on one another in a non-punctiform manner. An exemplary situation is shown in FIG. 3, where, in relation to the direction A, tangential to the tread surface 3, at a block 6a, there are formed the sections 13a, 13b and 13c of a first sipe portion 10, the projections of which in the direction A on a straight line B perpendicular thereto are superposed on one another at 14.

Each first sipe 10 is further configured so as to have a consecutive repetition of the same basic geometric module, forming the dove-tail coupling. In this way, the male/female-type couplings 11 are substantially identical to one another and, in a manner which is particularly obvious on the blocks 6a extending predominantly axially, each first sipe 10 defines a continuous succession of male/female-type couplings 11 between the block portions 8, 9.

Moreover, it should be noted that owing to this configuration, between two male/female-type couplings 11 consecutive to each other there is defined a male/female-type coupling 12, configured in a substantially identical manner, but of opposite direction to the male/female-type couplings 11.

On each block 6a, 6b there is further provided, in a position interposed between the first sipes 10 and substantially parallel thereto, a second sipe 20, of the non-restrained type.

In accordance with the definition given previously, the second sipe 20 is configured in such a manner as to permit, between respective block portions 21, 22 divided by it, mutual displacement in at least one direction substantially tangential to the tread surface 3. In the preferred example described herein, the block portions 21, 22 are mutually displaceable in the circumferential direction Y.

The blocks 6a extending predominantly axially may have a reduced circumferential measurement ("short pitch" block) or a greater circumferential measurement ("long pitch" block). Both the former and the latter are provided with two first sipes 10, extending at the circumferentially opposed sides of the block 6a, while the number of second sipes 20 interposed between the first sipes 10 varies: in the case of short pitch blocks, only one second sipe 20 is provided, while in the case of long pitch blocks, two second sipes 20 are provided.

It should be noted that no block portion is delimited along the respective axial sides only by first sipes 10.

Similarly to the blocks 6a, 6b, also on the blocks 7, extending predominantly in the direction Z, there are provided first sipes 30, of the restrained type. The first sipes 30 may extend substantially parallel to the inclined direction Z, or, on the contrary, substantially perpendicularly to the inclined direction Z.

Moreover, also on the blocks 7 there may be provided second sipes 31, at intervals from the first sipes 30 and substantially parallel thereto, of the non-restrained type.

The Applicant subjected the tyre 1 to tests for grip, in particular during braking, and for driving behaviour on different roadbeds (snow-covered, wet and dry) and compared the results with a tyre very similar in terms of dimensions, composition and tread pattern, but with blocks provided with sipes of the non-restrained type.

The results obtained, as illustrated in Table 1, show performances on a snow-covered roadbed which were very similar in the two tyres, while in wet and dry road conditions the performances provided by the tyre produced in accordance with the present invention proved to be noticeably superior.

TABLE 1

| | Comparison tyre | Tyre of invention |
| --- | --- | --- |
| Braking on snow | 100 | 100 |
| Traction on snow | 100 | 100 |
| Driving behaviour on snow | 100 | 105 |
| Braking on wet | 100 | 103 |
| Grip on wet | 100 | 105 |
| Driving behaviour on wet | 100 | 100 |
| Braking on dry | 100 | 105 |
| Driving behaviour on dry | 100 | 105 |
| Longitudinal rigidity of tread | 100 | 100 |

The invention claimed is:

1. A tyre comprising:
a tread band on which a radially outer tread surface is defined;
a first plurality of blocks provided on said tread band; and
at least a first sipe of a restrained type on at least one block of said first plurality of blocks in a substantially axial direction defined on said tread band,
wherein said first sipe divides a first and a second block portion having at least two separate and distinct couplings of a male/female type to prevent the mutual displacement of said first and said second block portions in any direction which is substantially tangential to said tread surface, and such as to permit mutual displacement of said first and said second block portions in a direction normal to said tread surface, said first sipe not intersecting in said block any other sipe of the restrained type,
wherein between said at least two separate and distinct couplings of a male/female type, an opposite coupling of a male/female type is defined having a configuration substantially identical to but in a direction opposed to said at least two separate and distinct couplings of a male/female type, and
wherein each outermost section of each of said at least two separate and distinct couplings of a male/female type with respect to the centerline of the sipe has a linear contour, each outermost section of said opposite coupling of a male/female type with respect to the centerline of the sipe has a linear contour, and said linear contour of each of the outermost sections of said at least two separate and distinct couplings of a male/female type are nonparallel with respect to said linear contour of the outermost section of said opposite coupling of a male/female type.

2. The tyre according to claim 1, further comprising a second sipe of a non-restrained type on at least one block of said first plurality of blocks, wherein said second sipe of the non-restrained type divides respective block portions and is configured to permit mutual displacement between said respective block portions in at least one direction substantially tangential to said tread surface.

3. The tyre according to claim 1, wherein on at least one block of said first plurality of blocks at least two first sipes of the restrained type are provided, spaced from each other, and extending in said substantially axial direction.

4. The tyre according to claim 3, further comprising a second sipe of a non-restrained type on at least one block of said first plurality of blocks, wherein said second sipe of the non-restrained type divides respective block portions and is configured to permit mutual displacement between said respective block portions in at least one direction substantially tangential to said tread surface, and wherein at least one second sipe of the non-restrained type extends between said two first sipes of the restrained type.

5. The tyre according to claim 4, wherein said second sipe extends substantially parallel to said first sipes of the restrained type.

6. The tyre according to claim 3, wherein said at least two first sipes of the restrained type are spaced from one another by a distance between 3 and 30 millimeters.

7. The tyre according to claim 1, wherein for each block of said first plurality of blocks, at most three sipes of the restrained type are arranged.

8. The tyre according to claim 1, wherein the blocks of said first plurality of blocks extend predominantly in said axial direction.

9. The tyre according to claim 1, wherein the blocks of said first plurality of blocks extend predominantly in a circumferential direction defined on said tread band.

10. The tyre according to claim 1, wherein, on said tread band, a second plurality of blocks is provided, extending predominantly in a direction inclined with respect to said axial direction and to a circumferential direction defined on said tread band, at least a first sipe of a restrained type extending substantially parallel to said inclined direction in at least one block of said second plurality.

11. The tyre according to claim 1, wherein on said tread band a second plurality of blocks is provided, extending predominantly in a direction inclined with respect to said axial direction and to a circumferential direction defined on said tread band, at least a first sipe of a restrained type extending substantially perpendicular to said inclined direction in at least one block of said second plurality.

12. The tyre according to claim 1, wherein, for each direction substantially tangential to said tread surface, there are formed, at said male/female-type coupling, at least two separate sections of said first sipe of the restrained type, projections of which in said direction are superposed on one another in a non-punctiform section.

13. The tyre according to claim 1, wherein the configuration of said first sipe of the restrained type is defined by consecutive repetition, along a length of said first sipe of the restrained type, of a basic geometric module.

14. The tyre according to claim 1, wherein said at least two male/female-type couplings are of a dove-tail type.

15. The tyre according to claim 1, wherein at least two male/female-type couplings are configured in a substantially identical manner.

16. The tyre according to claim 1, wherein said first sipe of the restrained type extends within said block of said first plurality of blocks in a direction substantially perpendicular to said tread surface.

17. The tyre according to claim 1, wherein the linear contour of each of said outermost sections of each of said at least two separate and distinct couplings of a male/female type are parallel with respect to each other.

* * * * *